(12) United States Patent
Weigelt et al.

(10) Patent No.: US 6,848,584 B2
(45) Date of Patent: Feb. 1, 2005

(54) STRAINER BASKET AND METHOD OF MAKING AND USING THE SAME

(75) Inventors: Darrell J. Weigelt, Seabrook, TX (US); David W. Clem, Spring, TX (US)

(73) Assignee: Drilltec Patents & Technologies Co., Inc., Houston, TX (US)

( * ) Notice: Subject to any disclaimer, the term of this patent is extended or adjusted under 35 U.S.C. 154(b) by 1 day.

(21) Appl. No.: 10/255,504

(22) Filed: Sep. 26, 2002

(65) Prior Publication Data

US 2004/0060856 A1 Apr. 1, 2004

(51) Int. Cl.$^7$ .......................... B01D 29/00; B01D 35/28
(52) U.S. Cl. ...................... 210/470; 210/232; 210/237; 210/238; 210/448
(58) Field of Search ................ 210/232, 237, 210/238, 441, 443, 448, 451, 455, 463, 464, 470, 498

(56) References Cited

U.S. PATENT DOCUMENTS

| | | | | |
|---|---|---|---|---|
| 3,596,294 A | * | 8/1971 | Hoffman | 4/287 |
| 3,698,562 A | | 10/1972 | Farrow et al. | 210/488 |
| 3,711,874 A | * | 1/1973 | Gajer | 4/287 |
| 4,032,457 A | | 6/1977 | Matchett | 210/489 |
| 4,046,695 A | | 9/1977 | Tucker | 210/340 |
| 4,059,519 A | | 11/1977 | Zieg | 210/169 |
| D255,480 S | | 6/1980 | Zieg | D23/4 |
| 4,212,740 A | | 7/1980 | Greene | 210/169 |
| 4,232,407 A | * | 11/1980 | Williams | 4/287 |
| 4,632,753 A | | 12/1986 | Jacobsen et al. | 210/232 |
| 4,806,241 A | | 2/1989 | Holien | 210/248 |
| 4,835,798 A | | 6/1989 | Hernandez | 4/661 |
| 5,305,685 A | * | 4/1994 | Midden | 99/289 R |
| 5,401,396 A | | 3/1995 | Lescovich et al. | 210/108 |
| 5,418,983 A | | 5/1995 | Garguillo et al. | 4/287 |
| 5,427,679 A | | 6/1995 | Daniels | 210/170 |
| 5,433,144 A | | 7/1995 | Lee | 99/512 |
| 5,547,481 A | | 8/1996 | Herding et al. | 55/524 |
| 5,830,350 A | * | 11/1998 | Voss et al. | 210/169 |
| 5,885,452 A | | 3/1999 | Koteskey | 210/309 |
| 5,897,787 A | | 4/1999 | Keller | 210/767 |
| 6,013,181 A | | 1/2000 | Thellmann | 210/266 |
| 6,180,006 B1 | * | 1/2001 | Whiteman | 210/256 |
| 6,248,237 B1 | | 6/2001 | Mery et al. | 210/234 |
| 6,331,247 B1 | | 12/2001 | Zoeller et al. | 210/299 |
| D454,177 S | | 3/2002 | Tracy | D2/261 |
| 6,355,171 B1 | | 3/2002 | Rose et al. | 210/323.2 |
| 6,592,756 B1 | * | 7/2003 | Felix et al. | 210/169 |
| 6,598,334 B1 | * | 7/2003 | Edevold | 43/4 |
| 2002/0020678 A1 | * | 2/2002 | Loreno | 210/767 |
| 2002/0033365 A1 | | 3/2002 | Patil | 210/501 |

OTHER PUBLICATIONS

*Corrosion Resistant Polypropylene Basket Strainers Protect Equipment From Foreign Materials*, catalog from Plast–O–Matic Valves, Inc., printed off Internet in Aug. of 2002; 4 pages.
*Pipeline Basket Strainers*, catalog from Plast–O–Matic Valves, Inc.; 4 pages (Aug. 2002).
*Basket Strainers*, catalog from Spears; printed off the Internet in Aug. of 2002; 2 pages.

* cited by examiner

*Primary Examiner*—John Kim
(74) *Attorney, Agent, or Firm*—Conley Rose, P.C.

(57) ABSTRACT

A strainer basket is used in conduits or fluid systems and includes a non-metallic strainer basket in which a bio-cide is disposed to combat algae and fungal buildup along the surface of the basket and/or in the openings of the basket.

10 Claims, 5 Drawing Sheets

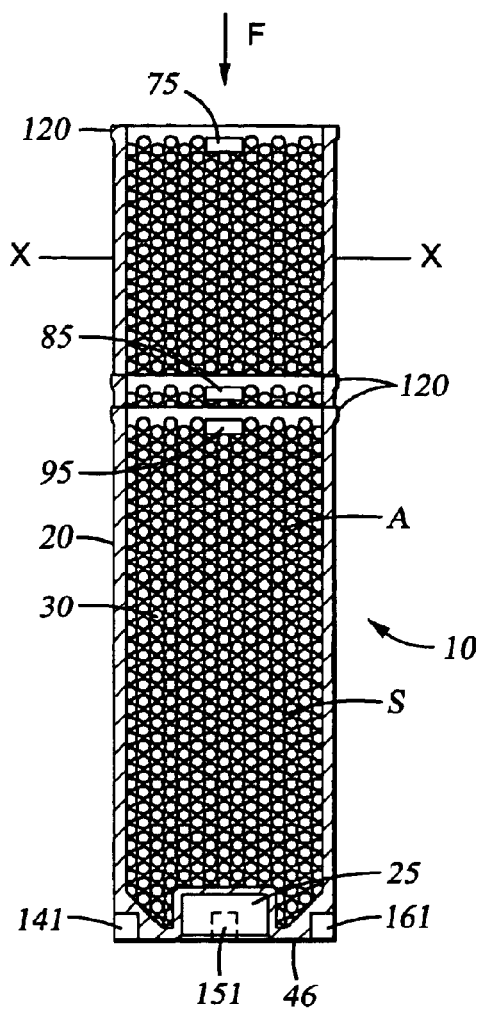
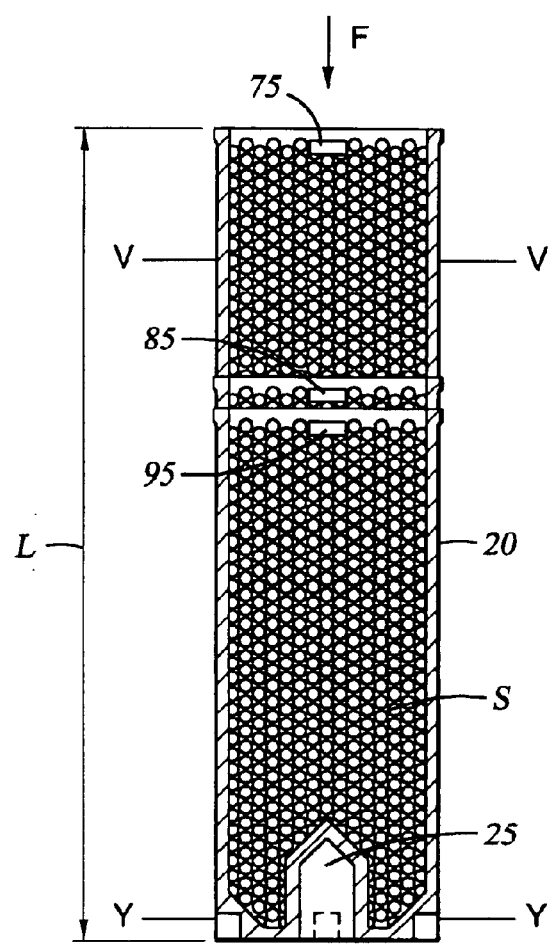
Fig. 2A
Fig. 2B
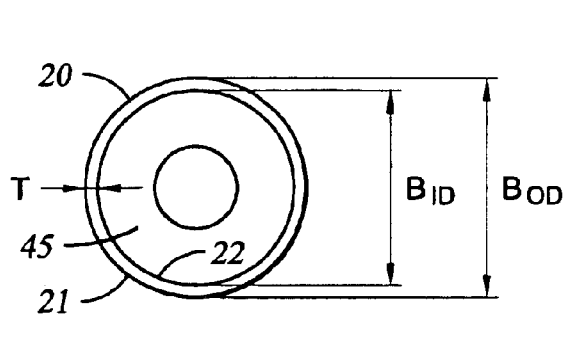
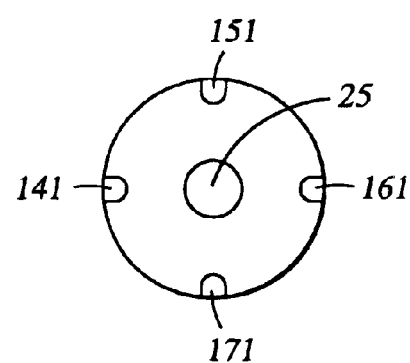
Fig. 2C
Fig. 2D

STRAINER BASKET AND METHOD OF MAKING AND USING THE SAME

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The invention relates generally to a strainer basket for use in conduits or fluid systems. Specifically, the invention relates to a unitary, non-metallic strainer basket. More specifically, the invention relates to a non-metallic strainer basket in which a bio-cide is added into or disposed onto the non-metallic material to combat algae, fungal, and bio-material buildup along the inner surface of the basket and/or in the openings of the basket.

2. Description of the Related Art

In order to provide for regular and intended flow of fluid through conduits and fluid systems, it is necessary to remove from the fluid certain materials (including clumps or coagulations of the fluid itself) that tend to prevent or restrict the flow of the fluid through the conduit or system. One way to accomplish this is to couple a strainer to the conduit or system.

The strainer typically comprises a housing and a removable perforated basket that allows fluid to flow through the perforations (and thus through the conduit or system), while preventing material or buildup that is larger than the diameter of the perforations from continuing through the conduit or fluid system. The material that is prevented from continuing in the conduit or system builds up in the strainer basket and must be removed or it would prevent or restrict flow through the strainer. Because the strainer basket is removable, it can be readily emptied of this buildup and placed back in the strainer itself.

In many applications a strainer is used in concert with a filter. By installing a strainer directly upstream of the filter, the larger materials that would quickly clog the filter are removed. The filter is then free to remove finer particles and does not have to be cleaned so often. Strainers are also used in many industries to protect pumps, nozzles, valves, heat exchangers, and other expensive equipment from harmful flow contamination by trapping dirt and foreign matter.

Prior art strainer baskets, however, suffer from at least three deficiencies. First, many of the strainer baskets are made of separate pieces that are bonded or welded together, usually stainless steel or Monel. In many instances, the body of the basket is bonded or welded to the bottom of the basket. Such baskets are prone to breaking at the bond or weld point. Second, the multi-piece prior art also is prone to having its handles break off. This poses a problem because the steel and Monel is rough and can cause injury should one attempt to remove the basket without the handle. Third, the perforations in the baskets tend to collect algae, fungus, or other bio-material which effectively reduces the diameter of the perforations and limits the amount of fluid that can flow through the perforations.

The present invention overcomes the deficiencies of the prior art.

SUMMARY OF THE INVENTION

The invention herein solves the deficiencies of the prior art. First, the invention is molded as a single non-metallic unit; there are no seams to create a weak point. Second, the invention has a non-metallic handle. Third, a bio-cide is used that is capable of killing the algae, fungal, and/or bio-material buildup in the bucket's openings and along the basket's surfaces. The bio-cide can be mixed with or let into the non-metallic material as the unit is being molded, or it can be disposed on the inner or outer surfaces of the basket. Additionally, the invention provides a basket that is recyclable.

In a preferred embodiment, the invention features a strainer basket comprising a seamless non-metallic body having openings therein. The invention further features a bio-cide that is molded into or disposed onto the body of the basket. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the invention, reference will now be made to the accompanying drawings, wherein:

FIG. 2A is a side view of an embodiment of the invention;

FIG. 2B is a side view of another embodiment of the invention having a different centering device;

FIG. 2C is a cross-sectional view of the embodiment of the invention shown in FIG. 2A taken along plane X—X in FIG. 2A;

FIG. 2D is a cross-sectional view of the embodiment of the invention shown in FIG. 2B taken along plane Y—Y in FIG. 2B;

DETAILED DESCRIPTION OF PREFERRED EMBODIMENTS

Figure 1:
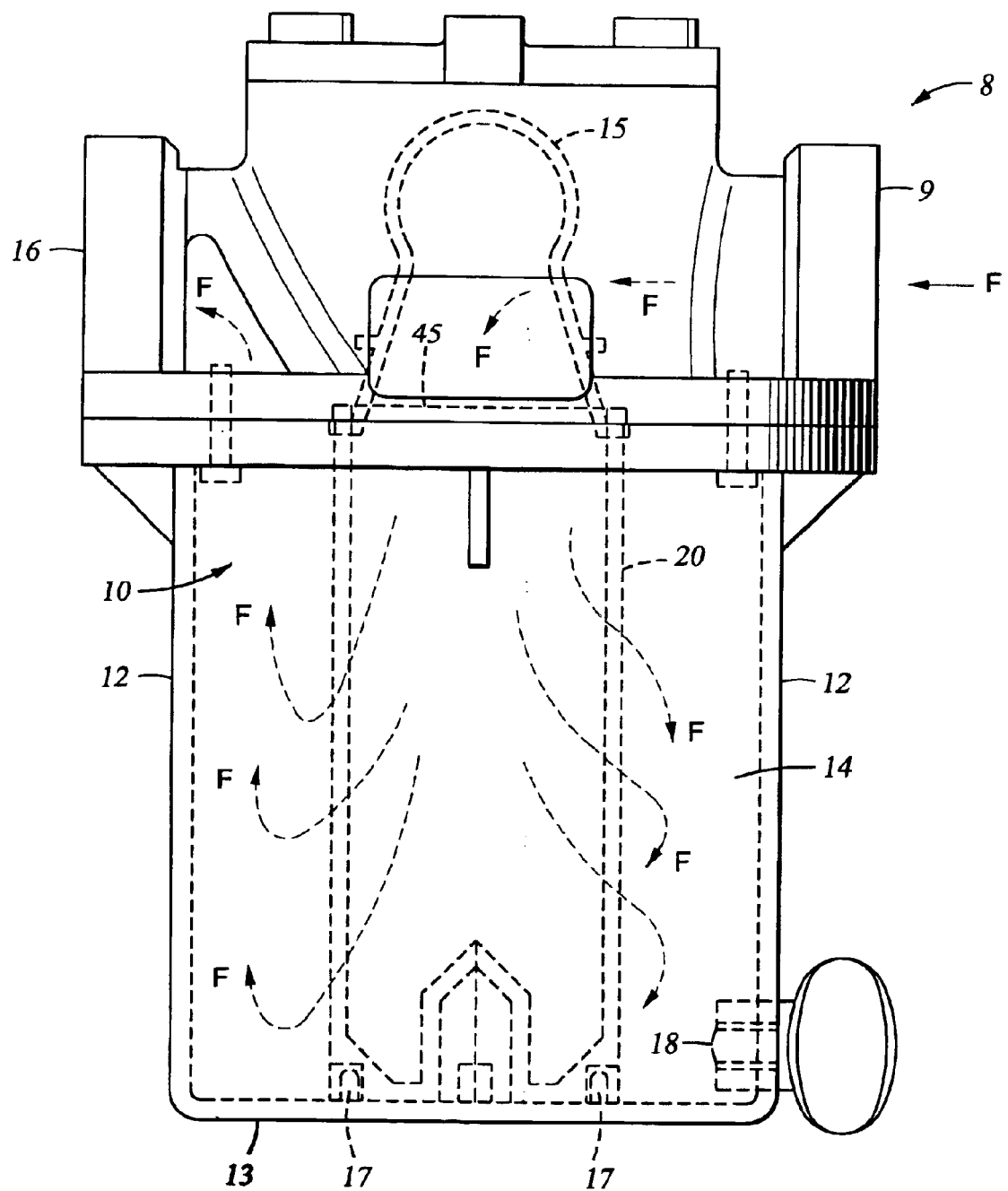
FIG. 1 is a side of view of a strainer showing an embodiment of the invention therein.

Referring initially to FIG. 1, there is shown a strainer 8 with a strainer basket 10 therein. Strainer 8 has a side wall 12, an end wall 13, a fluid passage 14, an entrance passage 9, and an exit passage 16. Strainer 8 may also have protrusions 17 that extend from end wall 13. Basket 10 is preferably disposed in fluid passage 14 and is preferably placed in sealing engagement with strainer 8 such that substantially all of the fluid that exits entrance passage 9 enters fluid opening 45 of basket 10. If strainer 8 has protrusions 17, then, as explained more fully below, basket 10 may have alignment slots 141, 151, 161, and/or 171 that mate with protrusions 17 to assist with alignment of basket 10 within strainer 8. Strainer 8 may also have a drain valve 18, which allows any residual fluid remaining in fluid passage 14 to be drained when the fluid flow through entrance passage 9 ceases.

FIG. 1 also shows the typical path of the fluid that flows through strainer 8 and basket 10. The fluid path is represented by Arrows F. Preferably, the fluid enters strainer 8 from entrance passage 9. The fluid then flows into fluid opening 45 of basket 10. Thereafter, the fluid flows into basket 10, through openings 30, and into fluid passage 14. The fluid is then forced out of strainer 8 through exit passage 16. It will be appreciated that FIG. 1 shows only a single embodiment of and use for the invention, but that the invention is not so limited and that many embodiments of and uses for the invention exist.

Turning next to FIGS. 2A–D, there is show an embodiment of a strainer basket 10 for use in conduits or fluid systems. In the embodiment shown, basket 10 comprises a body 20 and a handle 15. Body 20 has openings 30 and a length L. Body 20 is preferably made from polyethylene, but can also be made from any lightweight, solid non-metallic material, such as polyvinylchloride, polypropylene, Teflon, plastic, or composite plastic. Preferably, body 20 is formed by using a single mold, such as a sliding cam mold.

As shown in FIG. 2C, body 20 has an outer surface 21 and an inner surface 22. Body 20 also has an inner diameter $B_{ID}$, an outer diameter $B_{OD}$, and a thickness T. Body 20 also has a flow passage 45 through which the fluid passes. Although body 20 is shown as having a tubular shape, the invention is not so limited, and body 20 may take any shape, including but not limited to having a square or pyramidal shaped body 20.

Referring back to FIGS. 2A and 2B, body 20 has at least one annular ridge 120, but preferably has three annular ridges 120, which assist in alignment and stability of basket 10 in the strainer 8. Additionally, body 20 preferably has four alignment slots 141, 151, 161, and 171 disposed proximate to a terminal end 46 of body 20. It should be appreciated that body 20 may have more or fewer alignment slots and that slots 141, 151, 161, and 171 may be disposed or formed at various positions on body 20. As shown in FIG. 1, alignment slots 141, 151, 161, and 171 mate with protrusions 17 on strainer 8. This mating helps keep basket 10 aligned within strainer 8.

Referring now to FIGS. 3 and 5A–C, a handle 15 is disposed on body 20. Preferably, handle 15 has a frame 130 and a pair of legs 50. Frame 130 has a width W and, although frame 130 is shown as being circular, the invention is not so limited and frame 130 may take other shapes and forms. In the preferred embodiment, frame 130 has upper and lower portions 140, 150, respectively. Portions 140, 150 preferably are wider than the remainder of frame 130. This extra width helps to permit openings 100, described below, in upper and lower portions 140, 150.

Figure 5A:
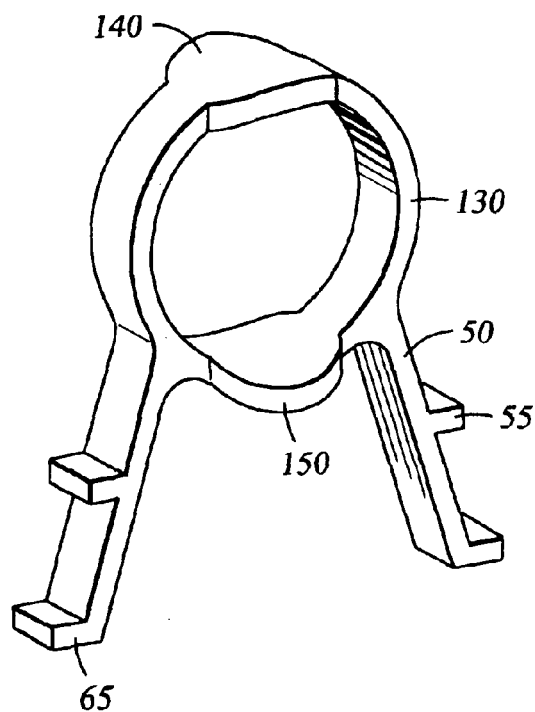
FIG. 5A is a perspective view of an embodiment of the handle of the present invention.
Figure 5B:
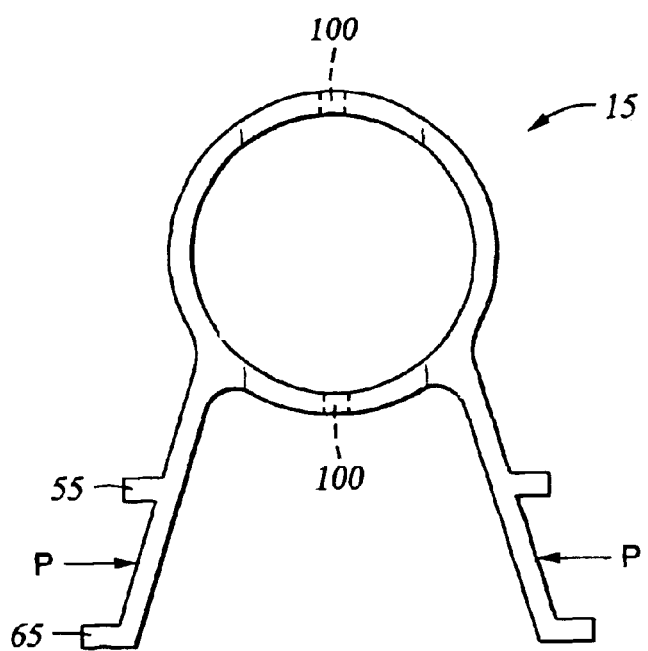
FIG. 5B is a front view of an embodiment of the handle with alignment openings being shown.
Figure 5C:
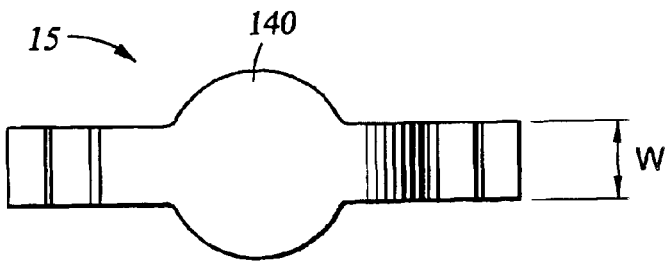
FIG. 5C is a top view of the handle shown in FIG. 5A.
Figures 6, 7:
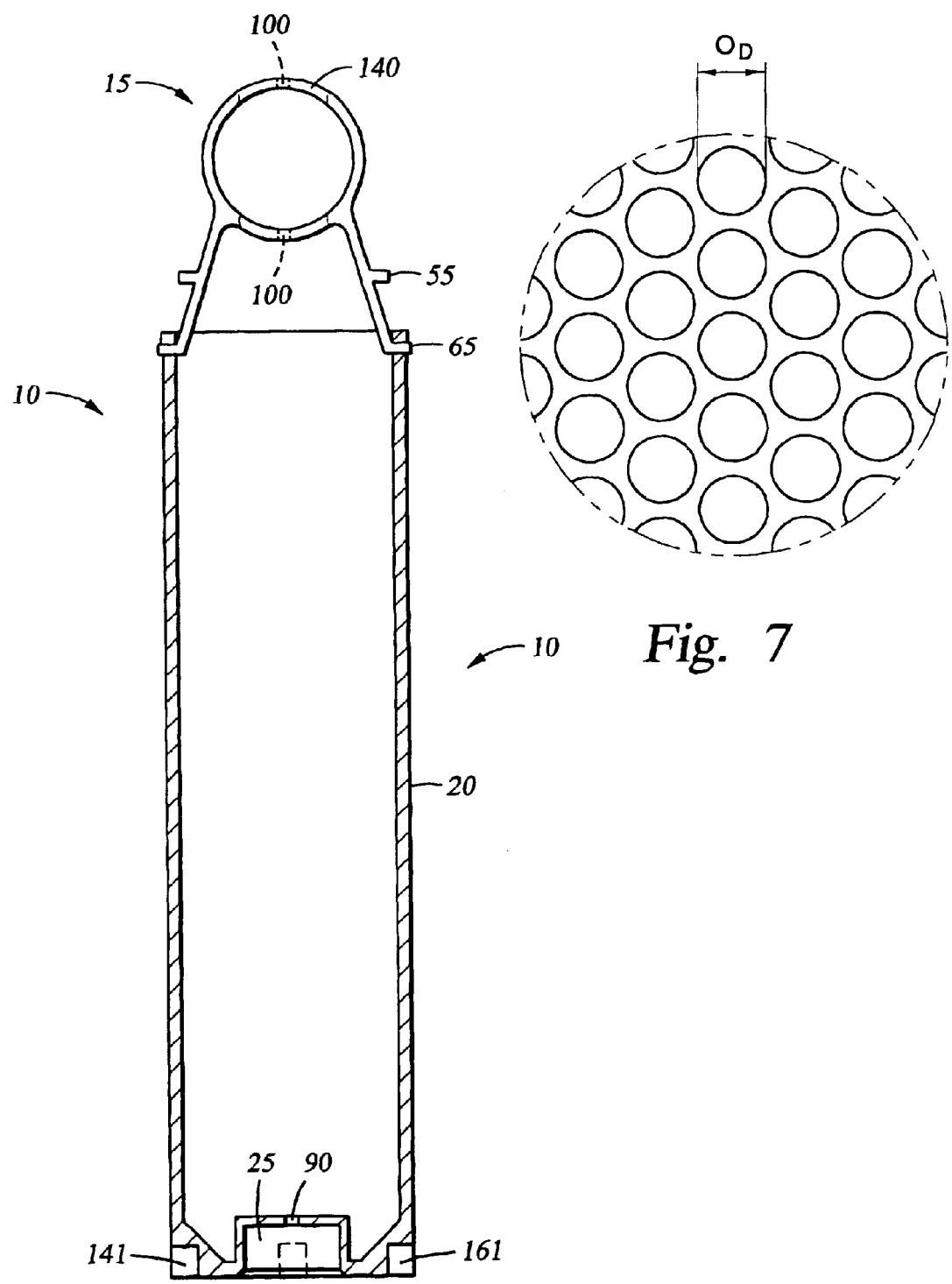
FIG. 6 is a cross-sectional side view of an embodiment of the present invention with a tab of the handle shown inserted into the windows on the body of the basket and with alignment openings shown.
FIG. 7 is an enlarged view of the openings of an embodiment of the invention.

Referring now to FIGS. 5B and 6, body 20 may have an alignment opening 90, and handle 15 may have alignment openings 100. These openings are preferably drilled into body 20 and into upper and lower portions 140, 150 of handle 15, but can be made in any number of ways. Openings 90, 100 are used to attach basket 10 to a centering stud in the strainer. The centering stud of the strainer passes through openings 90, 100, providing stability and alignment to basket 10 when in the strainer.

Figure 3:
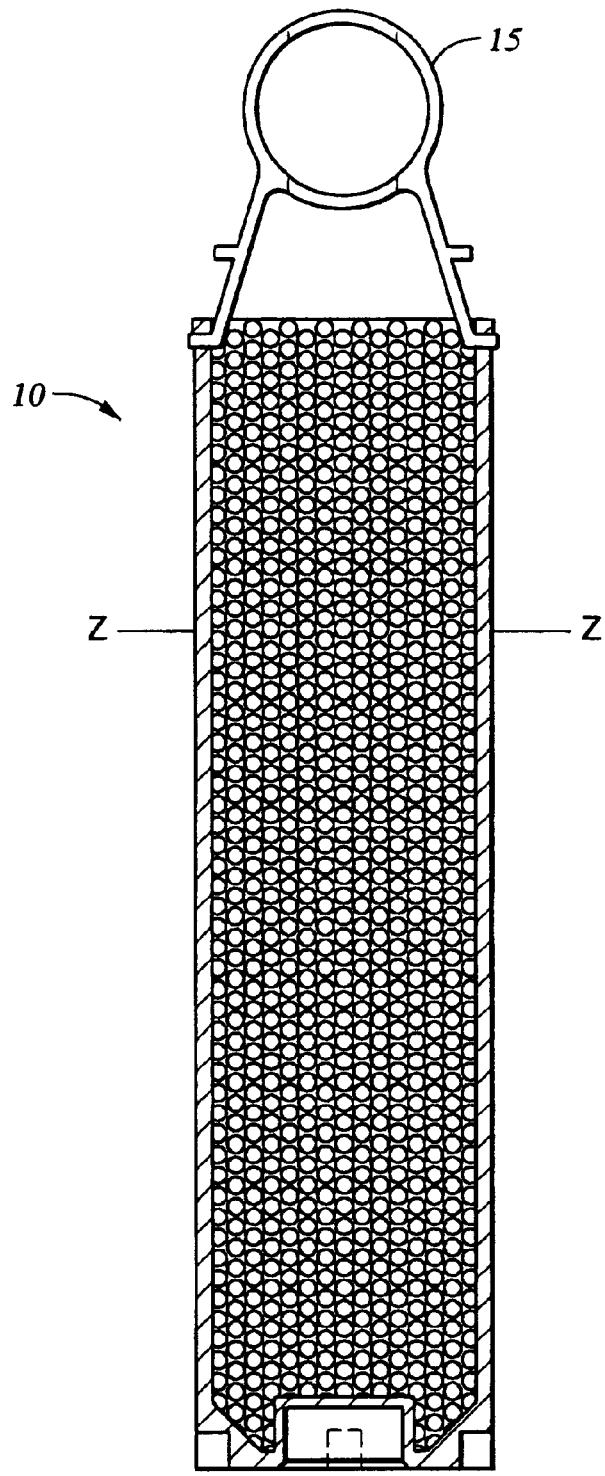
FIG. 3 is a side view of an embodiment of the invention showing the handle.
Figure 4A:
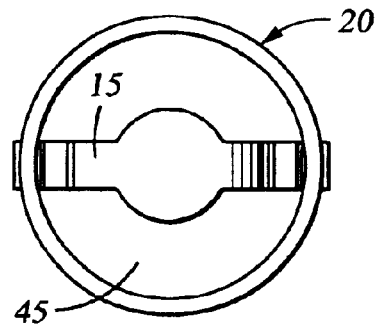
FIG. 4A is a cross-sectional view of the embodiments of the invention shown in FIGS. 2A, 2B, and 3 taken along plane Z—Z in FIG. 3 with the handle being in the upright position.
Figure 4B:
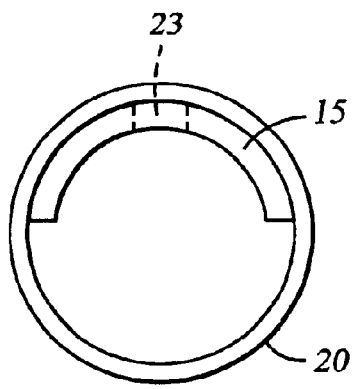
FIG. 4B is a cross-section view of the embodiment of the invention shown in FIGS. 4A, 2B, and 3 taken along plane Z—Z in FIG. 3 with the handle being in the retracted position.

Handle 15 is preferably coupled to body 20 such that it is fixed in the position shown in FIG. 3. In this position, handle 15 is in line with flow passage 45 and pressure is created on handle 15 by the flow of fluid through passage 45 helping to keep basket 10 in the strainer. In other embodiments, handle 15 can also be coupled to body 20 such that it can be placed along inner surface 22, as shown in FIG. 4B. A stop 23 coupled or formed into inner surface 22 of body 20 prevents handle 15 from rotating past the point shown in FIG. 4B.

Referring again to FIGS. 2A–B and 5A–C, legs 50 of handle 15 have a first set of tabs 55 and a second set of tabs 65. Sets of tabs 55 and 65 are means for coupling handle 15 to body 20. Specifically, sets of tabs 55 and 65 are sized to couple with indentations 75, 85, and/or 95 formed in body 20. The multiple sets of indentations 75, 85, and 95 and multiple sets of tabs 55, 65 allow for basket 10 to be manufactured in a single length L, but to then be shortened depending on the size of basket 10 that is needed. More specifically, if length L of basket 10 needs to be shorter than that shown in FIG. 2B, for example, then basket 10 can be cut across plane V—V and sets of tabs 55 or 65 can be inserted into indentation 85, for example. Thus, multiple indentations 75, 85, and 95 and multiple sets of tabs 55 and 65 allow a basket 10 to be manufactured in a single length L, but to then be easily shortened to accommodate various systems used.

Handle 15 is preferably coupled to body 20 by applying a compressive force to legs 50 of handle 15 in the direction of Arrows P in FIG. 5B. Once sufficiently compressed, legs 50 are inserted into the flow passage 45 of body 20 whereby at least one of sets of tabs 55 and 65 are aligned with at least one of sets of indentations 75, 85 and/or 95. When so aligned, the compressive force P is released allowing legs 50 to open, thereby positioning at least one set of tabs 55 and 65 into at least one set of indentations 75, 85, and/or 95.

Referring again to FIGS. 2A–B, in some embodiments, basket 10 also comprises a centering device 25. Centering device 25 is a depression in body 20 that assists in alignment of basket 10 in the strainer by mating with a protrusion in the strainer or system. This mating assists in keeping basket 10 centered in the strainer or system. FIGS. 2A and 2B show two embodiments of centering device but the invention is not so limited, and centering device 25 can be made to any necessary shape or size. Comparing centering devices 25 shown in FIGS. 2A and 2B, device 25 in FIG. 2A has a diameter greater than, and is deeper than, that of device 25 in FIG. 2B. This allows device 25 of FIG. 2B to mate with longer protrusions.

Referring now to FIG. 7, body 20 has openings 30 with a diameter $O_D$. Preferably, $O_D$ is constant for all openings 30. However, in some embodiments, openings 30 can have different diameters $O_D$. Openings 30 are sized to allow the fluid flowing through the conduit or system to move through basket 10 and to prevent certain materials from continuing past basket 10 in the conduit or system. In the embodiments shown in FIGS. 2A and 2B, the fluid flows through basket 10 in the direction of Arrow F.

Referring again to FIG. 3, body 20 has a surface area S. Preferably, openings 30 comprise approximately 40–50% of surface area S. However, openings 30 can comprise other percentages that are greater or less than 40–50%. As the fluid passes through flow passage 45, openings 30 allow the fluid to pass through basket 10 and continue through the fluid conduit, while also preventing certain materials from passing through basket 10.

Some factors in determining the diameter $O_D$ of openings 30 and/or the percentage of surface area S covered by openings 30 are the viscosity of the fluid and/or the density of the fluid passing through basket 10. The less viscous the fluid or the more dense the fluid, the larger the diameter $O_D$ that may be needed to allow the desired volumetric flow rate through basket 10. Additionally, the size of the contaminants that are likely to be found in the fluid passing through basket 10 may affect the diameter $O_D$. In the preferred embodiment, the diameter $O_D$ is smaller than the smallest estimated cross-section of the contaminants that may pass through basket 10. Additionally, the volumetric flow rate of the fluid that is moving through basket 10 may affect the size of openings 30. For example, the greater the desired volumetric flow rate, the larger that diameters $O_D$ of openings 30 may need to be to achieve the desired flow rate.

In the preferred embodiment, a bio-cide can be added to the mold during the manufacturing process to combat algae and fungal buildup from the fluids. Preferably, the bio-cide is mixed with or let down into the non-metallic material, thereby combining the bio-cide with the non-metallic material. In another embodiment, the bio-cide is disposed on outer surface 21 and/or inner surface 22 of body 20. The bio-cide may be any agent capable of killing or retarding the growth of algae, fungal, or bio-material buildup, including but not limited to Polypearl®, which contains calcium carbonate as the active ingredient, and Zinc Omadine®, which contains zinc oxide as the active ingredient.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

What is claimed is:

1. A strainer basket, comprising:
    a unitary polyethylene body having openings therein;
    a handle coupled to said body; and
    a bio-cide mixed into said polyethylene body, wherein said handle comprises legs and a frame having a width, and wherein said frame has upper and lower portions, said upper and lower portions being wider than the width of said frame.

2. The strainer basket of claim 1, wherein said body has at least two windows formed therein and wherein said handle has legs.

3. The strainer basket of claim 1, wherein each of said legs has a tab and wherein said tabs are disposed in said windows.

4. The strainer basket of claim 1, further comprising a centering device disposed on said body.

5. A basket for use in strainer systems, comprising:
    a non-metallic body having multiple openings; and
    a bio-cide disposed on, mixed with, or let into said non-metallic body; and
    a handle coupled to said body;
    wherein said body has an alignment opening and said handle has a frame with upper and lower portions, wherein said upper and lower portions of said handle each has an alignment opening.

6. A system for straining a fluid, the system comprising:
    a strainer compartment comprising a fluid passage, an entrance, and an exit; and
    a strainer basket, said strainer basket comprising a non-metallic body having a fluid opening, said body further having a plurality of openings therein;
    a bio-cide disposed on, mixed with, or let into said non-metallic body;
    wherein said strainer basket being disposed within said fluid passage of said strainer compartment;
    wherein said strainer compartment and strainer basket are configured such that at least a portion of the fluid is capable of passing from said entrance, through said fluid opening in said basket, through said openings in said body, and through said exit of said strainer compartment; and
    wherein said strainer compartment further comprises a centering stud and wherein said non-metallic body has a body alignment opening capable of receiving said centering member.

7. The system of claim 6, wherein said strainer basket further comprises a handle.

8. The system of claim 7, wherein said handle has a handle alignment opening capable of receiving said centering member.

9. A system for straining a fluid, the system comprising:
    a strainer compartment comprising a fluid passage, an entrance, and an exit; and
    a strainer basket, said strainer basket comprising a non-metallic body having a fluid opening, said body further having a plurality of openings therein;
    a bio-cide disposed on, mixed with, or let into said non-metallic body;
    wherein said strainer basket being disposed within said fluid passage of said strainer compartment;
    wherein said strainer compartment and strainer basket are configured such that at least a portion of the fluid is capable of passing from said entrance, through said fluid opening in said basket, through said openings in said body, and through said exit of said strainer compartment; and
    wherein said strainer compartment further comprises a plurality of protrusions and said strainer basket further comprises a plurality of alignment slots, said alignment slots capable of mating with said protrusions.

10. A system for straining a fluid, the system comprising:
    a strainer compartment comprising a fluid passage, an entrance, and an exit; and
    a strainer basket, said strainer basket comprising a non-metallic body having a fluid opening, said body further having a plurality of openings therein;
    a bio-cide disposed on, mixed with, or let into said non-metallic body;
    wherein said strainer basket being disposed within said fluid passage of said strainer compartment;
    wherein said strainer compartment and strainer basket are configured such that at least a portion of the fluid is capable of passing from said entrance, through said fluid opening in said basket, through said openings in said body, and through said exit of said strainer compartment; and
    wherein said strainer compartment further comprises a protrusion, and wherein said strainer basket further comprises a terminal end, said terminal end comprising a centering device located approximately in the mid point of said terminal end and capable of mating with said protrusion.

* * * * *

UNITED STATES PATENT AND TRADEMARK OFFICE
CERTIFICATE OF CORRECTION

PATENT NO. : 6,848,584 B2
DATED : February 1, 2005
INVENTOR(S) : Darrell J. Weigelt, David W. Clem and Bryan C. Baker It is certified that error appears in the above-identified patent and that said Letters Patent is hereby corrected as shown below:

<u>Title page,</u>
Item [75], Inventors, should read -- Darrell J. Weigelt, Seabrook, TX (USA)
David W. Clem, Spring, TX (USA)
and Bryan C. Baker, Houston, TX (USA) --

Signed and Sealed this

Twenty-fourth Day of May, 2005

JON W. DUDAS
*Director of the United States Patent and Trademark Office*